United States Patent
Katz et al.

(10) Patent No.: US 11,967,230 B2
(45) Date of Patent: Apr. 23, 2024

(54) SYSTEM AND METHOD FOR USING V2X AND SENSOR DATA

(71) Applicant: NOTRAFFIC LTD., Tel-Aviv (IL)

(72) Inventors: Uriel Katz, Givatayim (IL); Or Sela, Herzliya (IL); Tal Kreisler, Tel-Aviv (IL)

(73) Assignee: NOTRAFFIC LTD., Tel-Aviv (IL)

( * ) Notice: Subject to any disclaimer, the term of this patent is extended or adjusted under 35 U.S.C. 154(b) by 0 days.

(21) Appl. No.: 17/052,208

(22) PCT Filed: May 15, 2019

(86) PCT No.: PCT/IB2019/054006
§ 371 (c)(1),
(2) Date: Nov. 2, 2020

(87) PCT Pub. No.: WO2019/220353
PCT Pub. Date: Nov. 21, 2019

(65) Prior Publication Data
US 2022/0013008 A1    Jan. 13, 2022

Related U.S. Application Data
(60) Provisional application No. 62/672,076, filed on May 16, 2018.

(51) Int. Cl.
| | | |
|---|---|---|
| G08G 1/08 | (2006.01) | |
| G01S 5/00 | (2006.01) | |
| H04W 4/029 | (2018.01) | |
| H04W 4/38 | (2018.01) | |
| H04W 4/40 | (2018.01) | |

(52) U.S. Cl.
CPC .............. *G08G 1/08* (2013.01); *G01S 5/0072* (2013.01); *H04W 4/029* (2018.02); *H04W 4/38* (2018.02); *H04W 4/40* (2018.02)

(58) Field of Classification Search
CPC ........ G08G 1/08; G08G 1/0112; G08G 1/012; G08G 1/0133; G08G 1/0145; G08G 1/087; G08G 1/0116; G01S 5/0072; H04W 4/029; H04W 4/38; H04W 4/40
See application file for complete search history.

(56) References Cited

U.S. PATENT DOCUMENTS
| | | |
|---|---|---|
| 5,444,442 A | 8/1995 | Sadakata et al. |
| 9,129,519 B2 | 9/2015 | Aoude et al. |
| | (Continued) | |

FOREIGN PATENT DOCUMENTS
| | | | | |
|---|---|---|---|---|
| CN | 106157695 A | * | 11/2016 | ............. G08G 1/166 |
| JP | 2014222475 A | | 11/2014 | |
| | (Continued) | | | |

*Primary Examiner* — James J Yang
(74) *Attorney, Agent, or Firm* — WHITESTONE LAW, PLLC

(57) ABSTRACT

A method and system for traffic control includes receiving at a processing unit sensor data of a site on a road network and receiving at the processing unit a V2X communication. Locations of road users are calculated from the sensor data and the V2X communication enabling the detection of connected and non-connected road users. Once connected and non-connected road users are detected at a site, this information can be used to control traffic.

18 Claims, 12 Drawing Sheets

(56) References Cited

U.S. PATENT DOCUMENTS

| | | | |
|---|---|---|---|
| 2008/0200210 A1 | 8/2008 | Lim et al. | |
| 2009/0248284 A1 | 10/2009 | Yoshioka et al. | |
| 2010/0171640 A1* | 7/2010 | Delia | G08G 1/07 340/907 |
| 2010/0198513 A1 | 8/2010 | Zeng et al. | |
| 2010/0321207 A1 | 12/2010 | Etchegoyen | |
| 2011/0109478 A1 | 5/2011 | Williamson et al. | |
| 2011/0193722 A1 | 8/2011 | Johnson | |
| 2012/0033123 A1 | 2/2012 | Inoue et al. | |
| 2012/0123660 A1 | 5/2012 | Kagawa et al. | |
| 2014/0032089 A1 | 1/2014 | Aoude et al. | |
| 2014/0210645 A1 | 7/2014 | Sharma | |
| 2015/0334269 A1 | 11/2015 | Yokota et al. | |
| 2015/0381751 A1 | 12/2015 | Haran | |
| 2016/0234215 A1 | 8/2016 | Shankar | |
| 2016/0351048 A1 | 12/2016 | Thompson et al. | |
| 2017/0067991 A1 | 3/2017 | Liu et al. | |
| 2017/0092126 A1* | 3/2017 | Oshida | G08G 1/005 |
| 2017/0111981 A1 | 4/2017 | Recker et al. | |
| 2017/0199523 A1 | 7/2017 | Barton-Sweeney et al. | |
| 2017/0200370 A1* | 7/2017 | Miller | G08G 1/162 |
| 2018/0018874 A1 | 1/2018 | McNew | |
| 2018/0052458 A1 | 2/2018 | Tsuji et al. | |
| 2018/0284785 A1* | 10/2018 | Berntorp | G06V 20/584 |
| 2019/0371085 A1* | 12/2019 | Kishikawa | G08G 1/0112 |

FOREIGN PATENT DOCUMENTS

| | | |
|---|---|---|
| JP | 6036535 | 11/2016 |
| JP | 6036535 B2 * | 11/2016 |
| WO | 2008053912 A1 | 5/2008 |
| WO | 2011013202 A1 | 2/2011 |
| WO | 2012018109 A1 | 2/2012 |
| WO | 2016170785 A1 | 10/2016 |
| WO | 2017022267 A1 | 9/2017 |

* cited by examiner

SYSTEM AND METHOD FOR USING V2X AND SENSOR DATA

FIELD

The present invention relates to communication between road users and between road users and infrastructure.

BACKGROUND

In an urban setting there are many blind spots for human road users. Autonomous vehicles can't solve these blind spots as their sensors are of limited field of view in a way similar to the human eye.

Connected road users (such as connected vehicles, bicycles, pedestrians, etc.) represent one of the technologies aimed at solving blind spots and other cases by transmitting information from one road user to the other regarding dangers, location of other road users, etc.

Possible communications between road users include: vehicles to vehicles (V2V) communication and vehicles to pedestrians (V2P) communication. Road users may also communicate with the road infrastructure in vehicle to infrastructure (V2I) communication and pedestrian to infrastructure (P2I) communication. These communication modes are generally termed vehicle to everything (V2X).

Currently, the competing standards used for V2X are DSRC (Dedicated Short Range Communication) and C-V2X/5G cellular based protocols. These two standards deal with the physical level of wireless communication of V2X, namely, the challenges related to low-latency, high reliability and high speed moving objects. Both standards support the same functional layer (transport layer) on which applications can be created.

At the core of V2X communication is a message set that is broadcasted by every connected road user at 10 hz. In the US standard (SAE J2375) the message set is called Basic Safety Message (BSM) or Personal Safety Message for pedestrians (PSM) and in the European standard (ITS-G5) the message set is called Cooperative Awareness Message (CAM). These message sets are mostly the same, functionality-wise.

A message set typically includes information such as: location (latitude and longitude) estimation and the accuracy of the location estimation, bearing in degrees in relation to the north, speed, acceleration, past trajectory and predicted future trajectory.

The information in the message set enables connected road users to use the road more safely and efficiently, reducing traffic congestion, accidents and air pollution.

However, one of the core issues with V2X communication is the need for mass adoption of this technology to make it viable. At the very least, two road users (e.g., two vehicles) must be connected for them to be able to communicate and in order for this technology to provide value. Until mass adoption of V2X communication capabilities, the value of having connectivity is practically none.

Adoption of technology is usually non-linear and can't be properly estimated, especially at the micro level (e.g. estimating how many of the total number of vehicles on a specific street are connected vehicles). The same applies to V2X technology adoption. Until 100% of the road users have V2X communication capabilities, systems using V2X information for decision making, may need to estimate the adoption rate of V2X technology in order to deduce a total amount of road users at a site, based on the amount of connected road users at that site.

In some cases, road infrastructure can communicate with road users. For example, traffic signal preemption (also called traffic signal prioritization) enables to manipulate traffic signals in the path of an emergency vehicle, halting conflicting traffic and allowing the emergency vehicle right-of-way, to help reduce response times and enhance traffic safety. Signal preemption can also be used to allow public transportation priority access through intersections, or by railroad systems at crossings, to prevent collisions.

Traffic signal preemption can be employed by V2I preemption which is based on the transmission of a preemption message (e.g. in SAE J2375—Signal Request Message—SRM) from a connected vehicle to the infrastructure, e.g., a traffic signal controller. Currently, a list of authorized vehicles (e.g., emergency vehicles and public transportation) is used to allow preemption only to listed vehicles.

A few major drawbacks of the current V2I preemption approach include the following:

Hacking or malfunction can cause malicious use of the SRM, thereby enabling preemption for non-authorized vehicles;

Every authorized vehicle needs to have a V2X subsystem installed, which increases the cost of the vehicle and delays the adoption of preemption in intersections;

Non-connected authorized vehicles aren't taken into account using this approach, which means that conflicting demands may not be handled properly. For example, a connected bus crossing the intersection from the north may get priority while at the same time a non-connected police car coming from the west may be delayed due to the priority given to the bus. The fact that the police car is not connected, and thus cannot communicate with the infrastructure, causes priority to be assigned incorrectly.

Even if V2X technology were widely adopted, there would still be scenarios not covered by V2X communication, such as non-connected road users (e.g. a small children) running into the street, V2X communication module malfunctioning, obstacles (such as a pothole) that are not connected, and so on.

For the reasons listed above, current use of V2X technology is inadequate to provide safety and other potential benefits of road users' connectivity.

SUMMARY

Embodiments of the invention provide full coverage of a site on a road network, enabling to detect and identify both connected and non-connected road users at the site, and enabling to emulate a situation where all road users are connected, even road users that are not using V2X communication. Thus, embodiments of the invention provide safety features and other applications enabled by V2X technology to all road users, even in the (extreme) case of having only one connected road user at the site.

Embodiments of the invention employ V2X communication to detect and identify connected road users in the vicinity of or approaching a site and sensors to detect all road users in vicinity of the site.

In one embodiment a traffic control system includes a sensor to detect a road user, the sensor mounted at a site on a road network; a V2X communication module; and a processing unit to receive inputs from the sensor and from the V2X communication module, the inputs including at least a location of a road user. The system may then detect and identify, based on the inputs, connected and non-connected road users.

BRIEF DESCRIPTION OF THE DRAWINGS

The invention will now be described in relation to certain examples and embodiments with reference to the following illustrative figures so that it may be more fully understood. In the drawings.

DETAILED DESCRIPTION

Figure 1A:
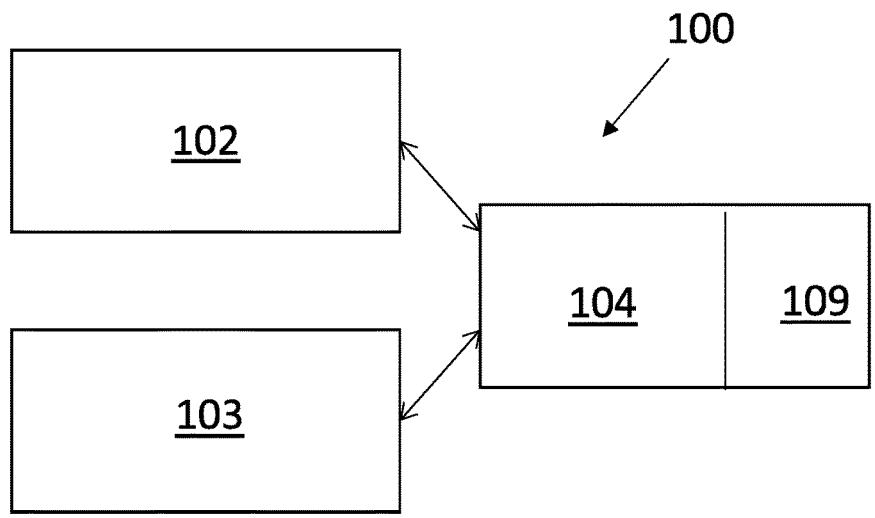
FIGS. 1A and 1B schematically illustrate a system and method for managing communication between road users, according to embodiments of the invention.

Embodiments of the invention provide locations of all road users at a predetermined site on the road network, enabling efficient traffic control at the site. Embodiments of the invention include detecting total road users and their locations, at a site, based on input from a sensor mounted in vicinity of the site and detecting connected road users and their locations, based on V2X communication. Non-connected road users are then detected by matching each connected road user to one of the total road users. All road users that are not matched are determined to be non-connected road users.

Location of a road user typically refers to coordinates which can be coordinates in the real world (i.e., location in a geographic coordinate system) or pixel coordinates within an image (e.g., a raster image or a point cloud image).

A virtual map, which includes information such as the locations of road users at any given time, can be created and used, for example, to calculate estimated time of arrival (ETA) of different users to different locations. Such a virtual map can be used to efficiently control traffic and in a myriad of safety applications, for example:

Warning of collision with objects that aren't in the road user's field of view;

Optimizing distance to the next car—by knowing the speed, acceleration and distance to nearby vehicles a connected and autonomous vehicle (CAV) can adapt its own speed and acceleration to keep a safe distance from the nearby vehicles, thereby improving safety and allowing smoother traffic flow;

Assisting a CAV with complex maneuvers in urban settings such as left turn movement in signalized intersections in the US (assisted left turn).

The term "road user" refers to any entity using the road network, for example, pedestrians, cyclists, motorcycles, private cars, trucks, buses, emergency vehicles, etc.

The term "road network" refers to the routes and structures used by road users for transportation. For example, roads, highways, junctions, paths, etc., may all be part of the road network.

Infrastructure of a road network includes accessories related to the road network and assisting the road users, such as traffic lights, lighting posts, traffic and other road signs, dynamic message signs (DMS), dynamic lane indicators, etc.

The term V2X used in this description refers generally to communication between all elements on a road network, for example, to communications between road users, between infrastructure and users, between infrastructures, etc.

Although the term "network" in this description and the examples herein all refer to roads, it should be appreciated that the invention relates to any network on which users travel, such as rivers, oceans, air, rails, etc.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "learning" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

In an exemplary system 100, which is schematically illustrated in FIG. 1A, a processing unit 104 is in communication with one or more sensors 102 that can detect a road user and one or more V2X communication modules 103 that can receive and transmit communication from and to connected road users. The processing unit 104 receives input (also referred to herein as sensor data) from the sensor 102 and from the V2X communication module 103 and can detect and optionally identify, based on the inputs, connected and non-connected road users.

Typically, the inputs from the sensor 102 and the V2X communication module 103 include at least the locations of the road users detected by the sensor 102 and the locations of the connected road users transmitting to the V2X communication module 103.

Sensor 102 may be, for example, optic based, radar based, sonic based or may use other suitable technologies to detect road users. Sensor 102 may include one or a combination of a camera, radar, lidar and/or other suitable sensors to detect a road user. Sensor 102 obtains data such as image or other data representing the road user and processing unit 104 may calculate from the data a location of the road user.

In the exemplary embodiments described herein, the sensor 102 includes a camera however, other sensors may be used. In one embodiment the sensor 102 includes a camera containing a CCD or CMOS or another appropriate chip. The camera may be a 2D or 3D camera. Processor 104 may apply image processing algorithms, such as shape and/or color detection algorithms and/or machine learning models such as convoluted neural networks (CNN) and/or support vector machine (SVM) to detect and possibly classify each road user and may use image processing and tracking algorithms to track each road user to calculate parameters such as location, bearing, speed, acceleration and past and future trajectory of each user.

The V2X communication module 103 can use suitable communication methods such as DSRC and/or C-V2X/5G to communicate with connected road users. For example, the V2X communication module 103 may include a DSRC or C-V2X/5G modem to receive data from connected road users using DSRC/C-V2X or fleet telematics (via cellular communication).

The information received from each connected road user typically includes the user's location (in geographic coordinate system), speed, acceleration, bearing, past and predicted future trajectory, similarly to the parameters calculated from the data received from the sensor 102. A class (e.g., private car, bus, pedestrian, etc.) and/or identification (e.g., V2X digital certificate, license plate number, etc.) of a road user may also be received via the V2X communication module 103.

Processing unit 104 can generate a signal based on these parameters and send the signal to connected road users and/or road infrastructure, via the V2X communication module 103, as further described below.

Processing unit 104 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processing unit 104 may include or may be in communication with a memory unit 109. Memory unit 109 may store at least part of the data received from sensor(s) 102 and/or the V2X communication module(s) 103.

Memory unit 109 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 109 stores executable instructions that, when executed by processing unit 104, facilitate performance of operations of processing unit 104, as described herein.

Components of the system 100 may be in wired or wireless communication and may include suitable ports and/or network hubs and/or appropriate cabling.

Additionally, system 100 may include or may be attached to a user interface device having a display, such as a monitor or screen, for displaying e.g., images, virtual maps, instructions and/or notifications (e.g., via text or other content displayed on the monitor). The user interface device may also be designed to receive input from an external user. For example, the user interface device may include a monitor and keyboard and/or mouse and/or touch screen, to enable an external user to interact with the system.

A storage device, connected locally or remotely, e.g., in the cloud, may be used with system 100. The storage device may be a server including for example, volatile and/or non-volatile storage media, such as a hard disk drive (HDD) or solid-state drive (SSD). In some embodiments the storage device may include software to receive and manage data input from sensor(s) 102 and/or V2X communication module(s) 103.

Figure 1B:
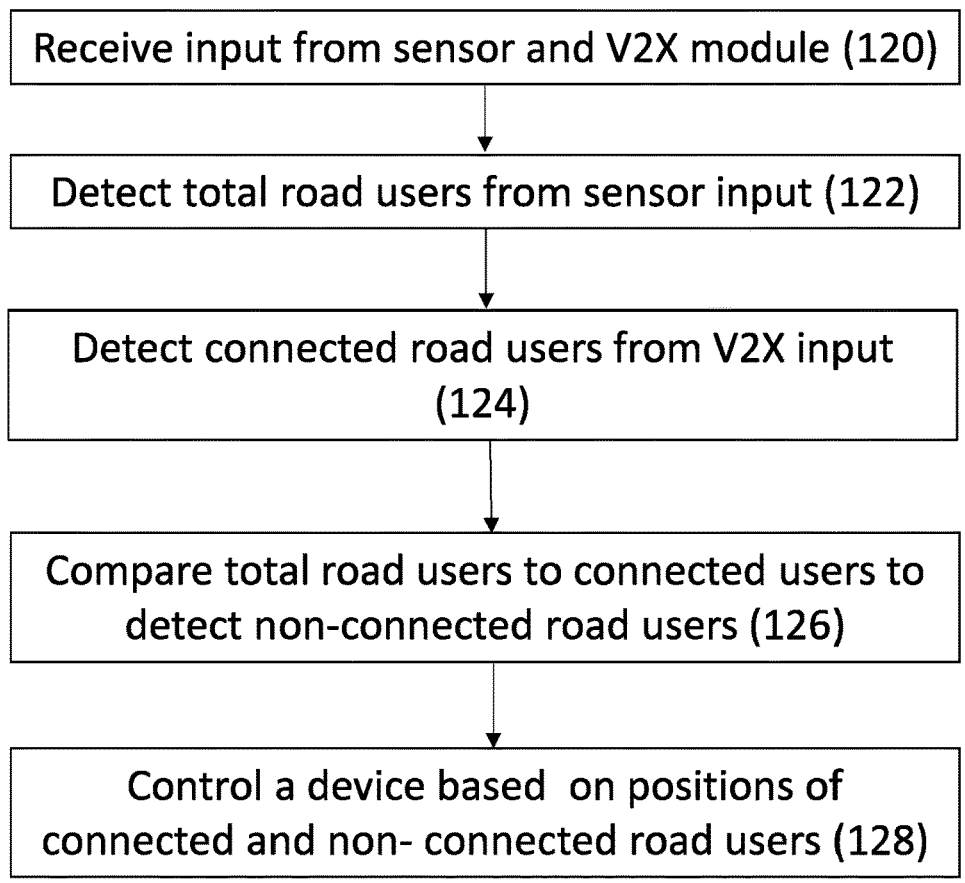

As schematically illustrated in FIG. 1B, processing unit 104 receives input from sensor 102 (step 120) and detects total road users from the sensor input (step 122). Typically, the group of total users includes all users within the field of view (FOV) of sensor 102.

In one embodiment, processor 104 uses information from the sensor input (namely, the user parameters calculated from the sensor input) to create and maintain a list or other record including identifiers (e.g., a value or other character representing the identity or other parameters of the road user) of the total road users detected in step 122. This list includes identifiers of both connected and non-connected users. Typically, a list of total users relates to users at a certain site, which is defined by the FOV of the sensor 102.

The processing unit 104 detects connected road users from input received from the V2X communication module 103 (step 124). Processor 104 may create and maintain another list or other record based on input from the V2X communication module 103. This list includes only connected users transmitting to the V2X communication module 103.

Processor 104 compares total road users to connected users to detect non-connected road users (step 126). For example, by comparing or matching the list of total road users to the list of connected road-users, the non-connected users out of the total users can be determined. A road user is considered to be a non-connected road user if there is no connected road user that can be matched to him.

In some embodiments a device may be controlled (e.g., by a signal generated by processing unit 104) based on the locations of connected and non-connected road users (step 128).

For example, processing unit 104 may create a message for each non-connected road user detected in step 126. The message (e.g. BSM and/or CAM and/or PSM, in current standards) typically contains the calculated user parameters (e.g., location, speed, acceleration, bearing, classification, past and predicted trajectory, etc.) and can be broadcasted via the V2X communication module 103 modem at the required frequency (e.g. 10 hz for vehicles, 2 hz for pedestrians), to all connected road users in the vicinity of the site.

In another example, which will be further described below, a traffic controller can be controlled by processing unit 104 in accordance with locations of road users.

Thus, embodiments of the invention enable controlling devices to provide safer and smoother traffic based on locations of both connected and non-connected road users.

Some embodiments described herein enable controlling devices to provide safer and smoother traffic based on other/additional parameters of connected and non-connected road users, such as bearing, speed, acceleration and trajectories of each user.

As described above, processing unit 104 may create and maintain a list of all road users in vicinity of and approaching a site on the road network, based on inputs from the sensor 102 and V2X communication module 103. The list of total road users is matched to a list of connected road-users and at least the locations of the connected and non-connected road users are determined.

Processing unit 104 may create a virtual map using the determined locations of the connected and non-connected road users. A virtual map may be created (e.g., calculated) periodically (e.g., at a predetermined frequency). In some embodiments the virtual map may be a dynamic virtual map that is updated periodically.

In one embodiment, by applying object detection and classification algorithms (e.g., using a CNN deep neural network such as YOLO object detection, SSD deep learning or Faster-RCNN) on data input from sensor 102, processor 104 detects and classifies road users and calculates a bounding shape (e.g., a 3D box) for each detected road user, possibly per classification. Accordingly, vehicles may have a different bounding shape than pedestrians, vehicles may have a different bounding shape than trains, etc.

Each bound road user is assigned a tracking ID and is tracked, e.g., by using an object tracking algorithm (such as a Siamese-CNN+RNN, MedianFlow, KLT, etc.).

The pose of each road user, identified by a tracking ID, may be calculated, e.g., based on the direction of each face of the 3D bounding box representing the user.

Parameters of each road user can be calculated based on locations of the user over time. For example, speed can be calculated either directly from radar data and/or by measuring a difference in user locations in images (pixel coordinates) over time.

Acceleration can be calculated by measuring difference in speed over time.

Bearing can be calculated based on the pose of the user and/or based on the angle between two (or more) locations of the same user in two or more different images obtained at different times.

Past trajectory of the user (which can be defined as a list of <location, time> pairs) can be calculated based on locations over time.

Future or predicted trajectory can be calculated using a prediction model (such as a recurrent neural network (RNN)) trained on information including the classification of the road user, past trajectory, speed, acceleration and bearing. The future trajectory can be defined as a list of <location, time> pairs, where time is in the future.

Processor 104 may then calculate a transformation function (e.g. perspective transformation matrix) that maps the pixel coordinates to a geographic coordinate system. In some cases, processing unit 104 may calibrate using the location of different known locations in the image, in pixel coordinates, and in the geographic coordinate system (e.g., latitude and longitude). Using a distance measurement function (such as the haversine formula) the distance in meters from two points in the geographic coordinate system can be calculated.

Processing unit 104 can use the transformation function, e.g., as described above, to create a virtual map from the user parameters calculated from inputs from the sensor 102, such as, location and/or pose in pixels/point cloud space, classification, speed, acceleration, bearing and past and predicted trajectory. The map may also include information relating to parameters (such as location, pose, classification, speed, acceleration, bearing and past and predicted trajectory) of connected users, who are not within the FOV of sensor 102. This information will typically be received from the V2X communication module 103, whereas information relating to parameters of a connected user who is within the FOV of sensor 102, will include information from both sensor 102 and V2X communication module 103.

Figure 2:
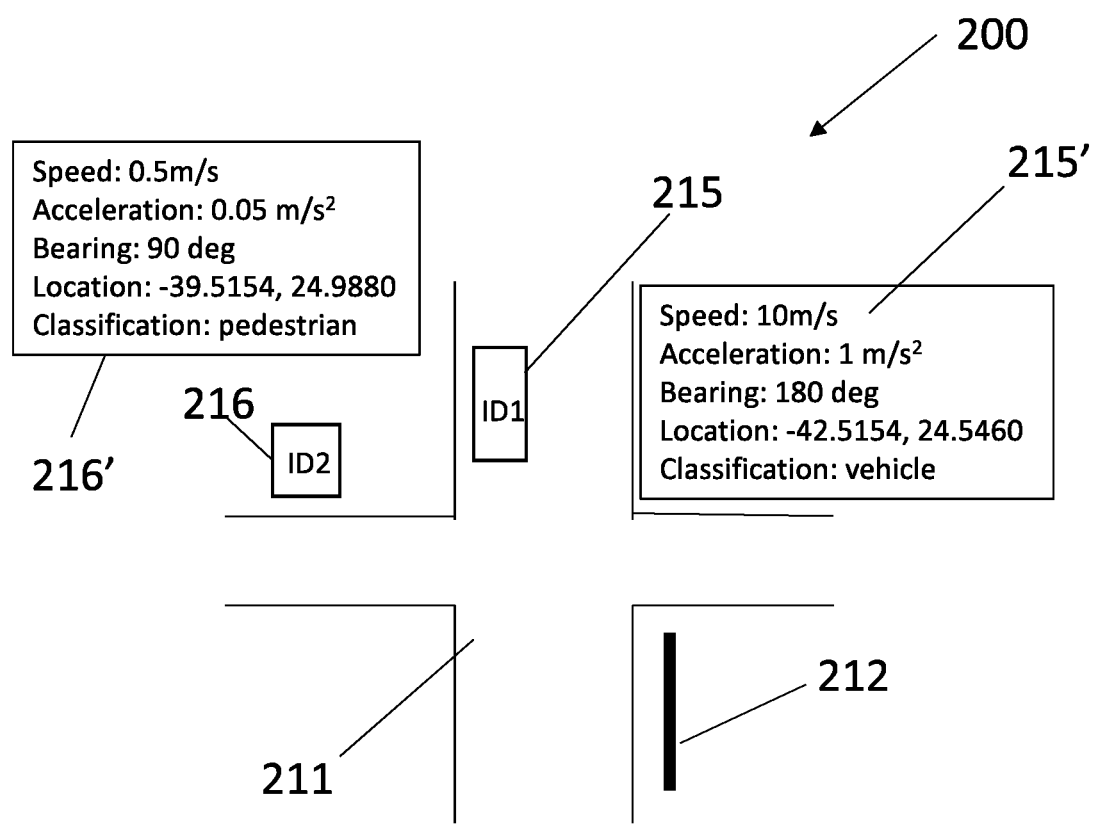
FIG. 2 schematically illustrates a virtual map constructed and used according to embodiments of the invention.

A virtual map 200 is schematically illustrated in FIG. 2. In one embodiment, the virtual map 200 depicts all the road users 215 and 216 with their IDs (ID1 and ID2) in a geographic coordinate system. Using, for example, the distance measurement function as described above, and the calculated user parameters, the virtual map 200 may further be augmented by information 215' and 216' for each road user 215 and 216 regarding, for example, the user's location (e.g., in latitude and longitude), speed (e.g., in meters per second), acceleration (e.g., in meters per second squared), bearing (e.g., in angles where 0 is the north), past and predicted trajectory (a list of <location, time> pairs where time might be in the future for the predicted trajectory). Additional parameters, such as class and/or identity (including for example, license plate number, color, shape, etc.), may also be added to the virtual map 200. Additional parameters or information that may be added to the virtual map 200 may include the status of the road user, e.g., connected, non-connected and connected and matched to sensor input.

The virtual map 200 may include graphic representations of the road network 211 and of the road network infrastructure 212 at locations representing their real-world locations. A graphic representation of the road users 215 and 216 may be superimposed on the map at appropriate locations.

In some embodiments processing unit 104 can calculate an estimated time of arrival (ETA) of a specific road user at a real-world location, based on the virtual map 200 and control a device according to the ETA, as further described below.

Figure 3A:
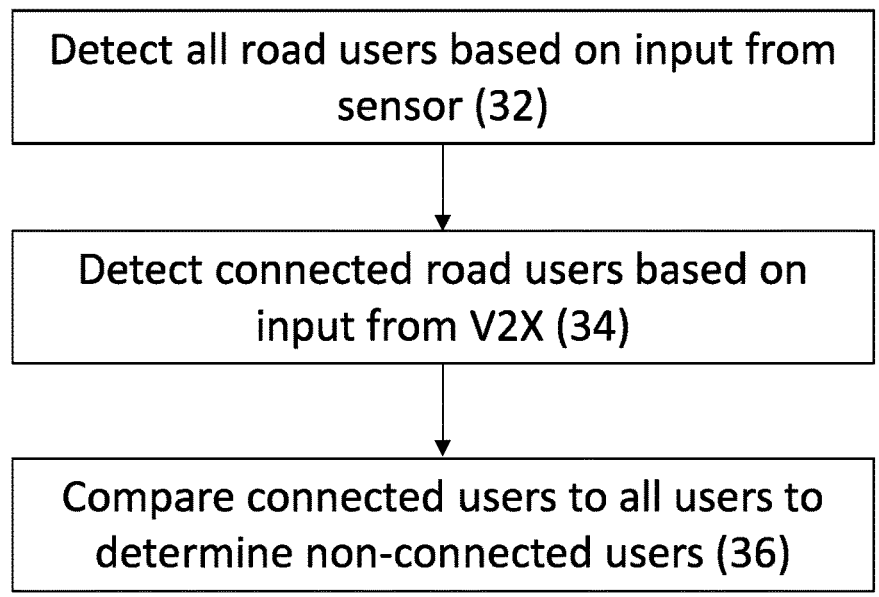
FIGS. 3A-3C schematically illustrate methods for matching connected and non-connected road users, according to embodiments of the invention.

As schematically illustrated in FIG. 3A, all road users at a site on a road network are detected in step 32, based on input from a sensor, such as sensor 102. The input from the sensor may include, for example, image data and/or point cloud data.

In step 34 connected road users are detected based on V2X transmissions, for example, by input from V2X communication module 103.

In step 36 at least one non-connected road user is detected by matching each connected road user (detected in step 34) to one of all of the road users (detected in step 32), whereby road users that are not matched are determined to be non-connected road users. In one embodiment, matching to determine non-connected users can be done by subtracting a list of connected users from a list of all users.

In step 32 input from a sensor is analyzed to detect all users. The input from the sensor may include image data and detecting all the road users may include applying object detection algorithms on the image data. In some embodiments the input from the sensor may include data from a radar sensor or lidar sensor (e.g., point cloud data) and detecting all the road users may include using clustering algorithms (such as DBSCAN) or neural networks such as CNNs, on the data.

In some embodiments a fine-grained classifier (such as a CNN) can be trained on images of different road users such as vehicles, trains, bicycles, pedestrians, etc. The trained classifier may be used by processing unit 104 to provide reliable fine-grained classification and identification of road users from image data.

In some embodiments, the matching of each connected road user to one of the road users detected in step 32, includes determining that at least one parameter of both road users shows similarity above a threshold.

Figure 3B:
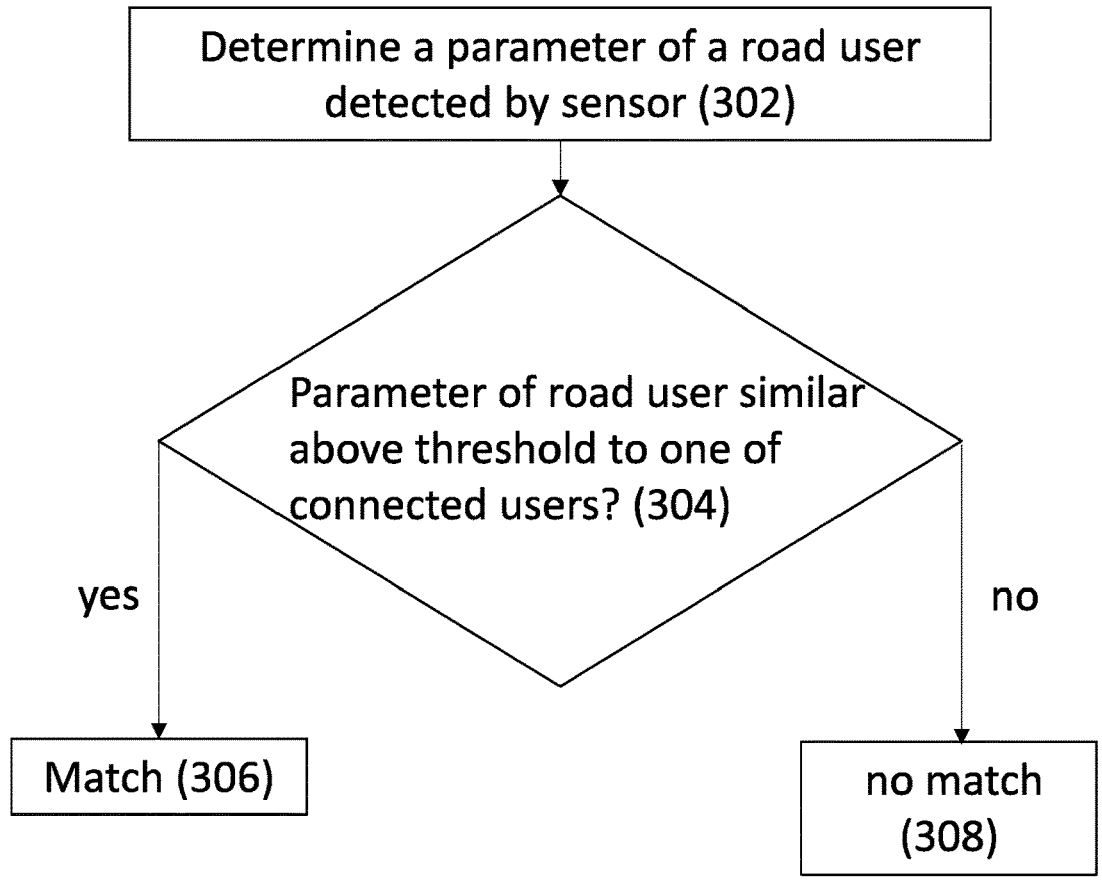

As schematically illustrated in FIG. 3B, a parameter of a road user that was detected from sensor data is determined (step 302). If the similarity of the determined parameter to that same parameter of a connected road user, is above a threshold (step 304), a match is found (step 306). If the similarity is below the threshold, no match is found (step 308).

In some embodiments more than one parameter must match above a threshold to confirm a match between two road users.

In one embodiment an object matching algorithm (such as template matching, feature matching, neural network with mapping to a latent vector space and cosine distance loss, etc.) is used to compare parameters of the road users (e.g., location, speed, acceleration, classification and trajectories).

In some cases, parameters of a certain road user determined based on input from the V2X communication module can be compared to the parameters (of that same road user) determined based on input from the sensor. For example, calculating parameters of users from sensor input may include the use of object detection and/or tracking algorithms whereas calculating parameters of connected users which are received from the V2X communication module, include the use of global positioning system (GPS) or inertial measurement unit (IMU) based devices. Comparison between parameters determined by these different techniques enables to determine inherent errors in the input from the V2X communication module and/or errors in calculations based on input from the sensor. In some embodiments the threshold can be set based on the determined inherent errors. For example, the threshold can be set to be above the probability of error (as determined by the determined inherent errors). In other embodiments the threshold is a predetermined threshold.

Figure 3C:
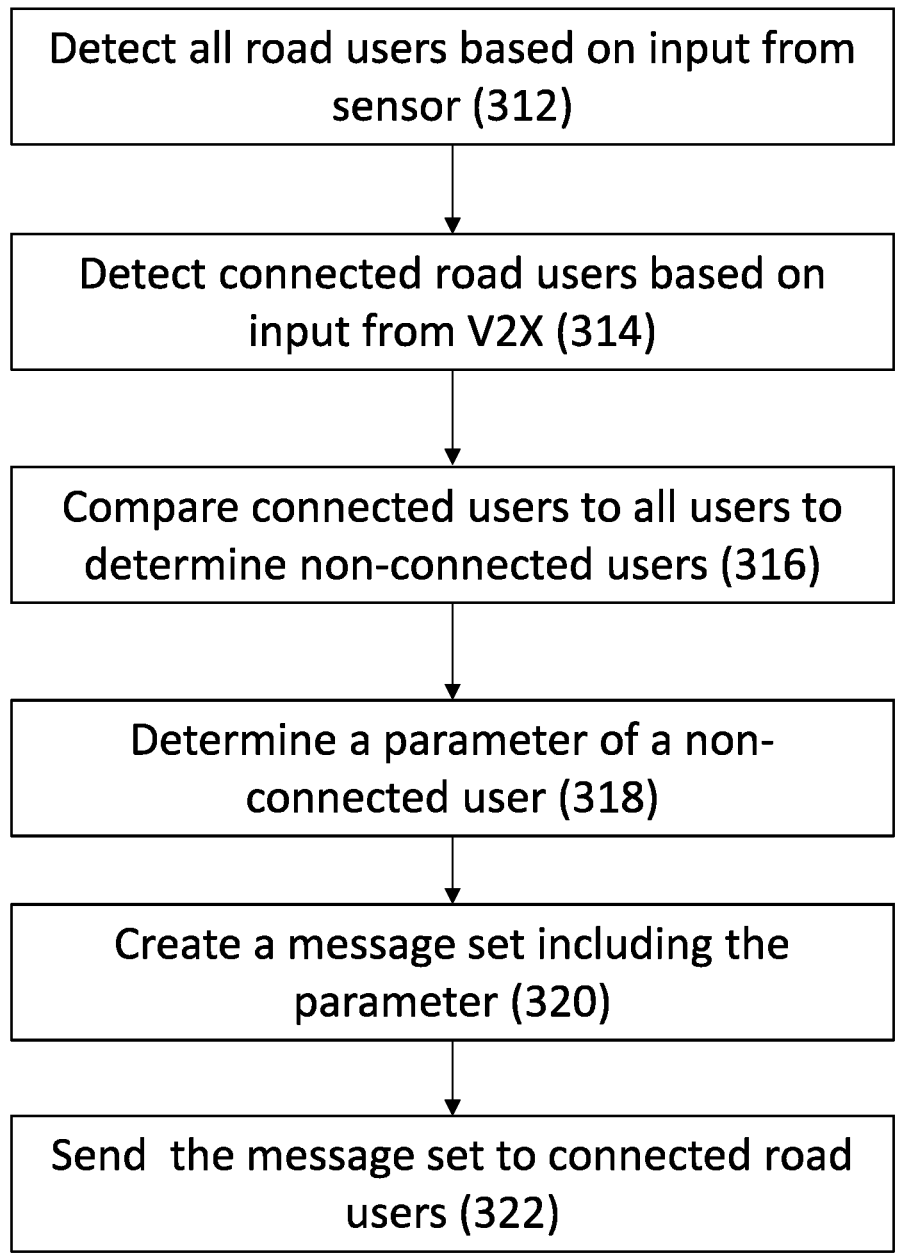

In a situation where not all road users are connected, connection of road users can be emulated using embodiments of the invention. For example, as schematically illustrated in FIG. 3C, all road users at a site on a road network are detected in step 312, based on input from a sensor, such as sensor 102.

In step 314 connected road users are detected based on V2X transmissions, for example, by input from V2X communication module 103.

In step 316 at least one non-connected road user is detected by matching all users to connected users, e.g., as described above.

In step 318 a parameter of a non-connected road user (such as classification, location, bearing, speed, acceleration and past and/or future trajectories) is determined, e.g., as described above.

A message set including the determined parameter is created (step 320) and the message set is sent out, e.g., via a V2X communication module, to connected road users and/or to road network infrastructure (step 322), enabling the non-connected road user to become "visible" and connected to other users and/or to the infrastructure.

Figure 4:
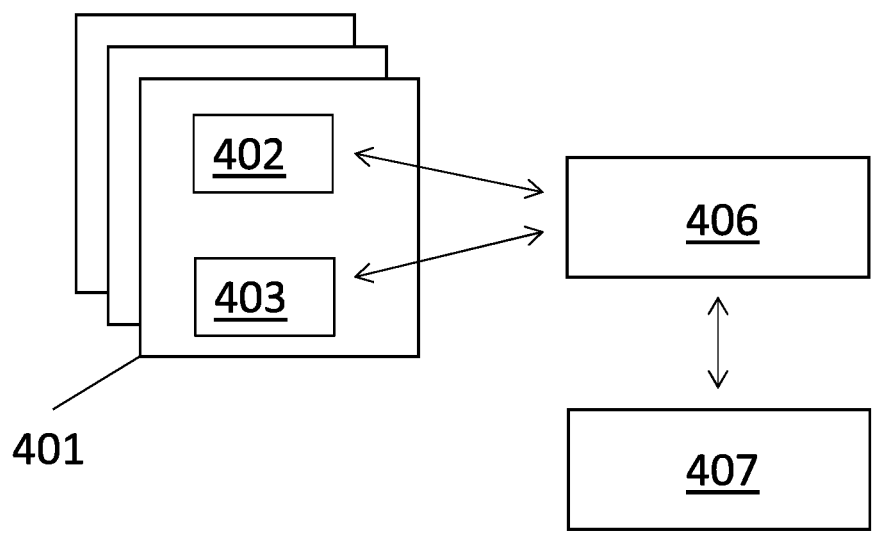
FIG. 4 schematically illustrates a network of sensors, according to an embodiment of the invention.

In one embodiment, an example of which is schematically illustrated in FIG. 4, a plurality of sensors 402 are in communication with a control unit 406. Control unit 406 may include a CPU or any other suitable processor and communication capabilities, such as wireless communication capabilities (e.g., Wifi, LoRa, Cellular, etc.) and/or wired communication (e.g., ethernet, fiber, etc.). Additionally, control unit 406 has V2X communication capabilities.

Control unit 406 can communicate directly with a road network infrastructure (such as dynamic message signs, dynamic lane indicators, etc.) or via a road network infrastructure controller unit 407, which is typically a dedicated computer for controlling infrastructure. For example, each traffic light is connected to a traffic light controller that controls the sequencing and duration of the traffic lights.

The control unit 406 may also be in communication with one or more V2X communication modules 403, which may be located at the same locations of sensors 402 and/or at appropriate locations to receive and transmit information from and to connected users and/or to the control unit 406.

The control unit 406 can send a signal to the road network infrastructure controller unit 407 based on the detection of connected and non-connected road users.

In some embodiments the control unit 406 can communicate with connected road users.

In some embodiments each sensor 402 and possibly a V2X communication module 403 and possibly a processing unit, are contained in a single housing 401. The housing typically provides stability for sensor 402 such that it is not moved while obtaining images or other data.

The housing 401 may be made of durable, practical and safe for use materials, such as plastic and/or metal. In some embodiments the housing 401 may include one or more pivoting element such as hinges, rotatable joints or ball joints and rotatable arm, allowing for various movements of the housing. For example, a housing can be mounted at a site on a road network to enable several FOVs to the sensor 402 which is encased within the housing 401, by rotating and/or tilting the housing.

Figure 5:
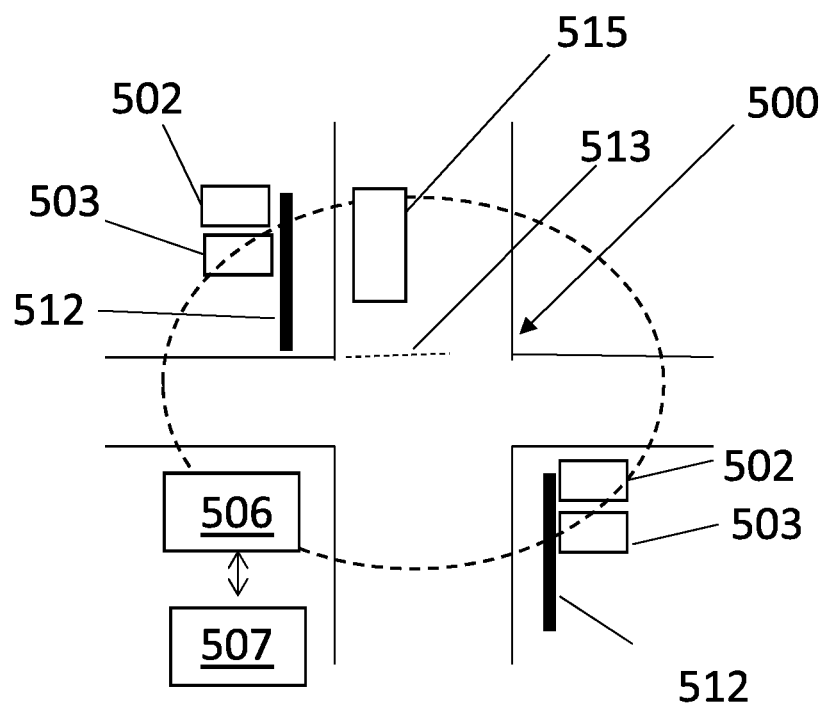
FIG. 5 schematically illustrates a typical deployment of a system operable according to an embodiment of the invention.

In one embodiment, which is schematically illustrated in FIG. 5, a network of sensors is deployed at a site on a road network. Each sensor 502 from the network can be mounted at a different location at the site.

Suitable sites for mounting sensors 502 include, for example:
  Intersections, typically signalized intersections, which are a critical part of modern road network and are a decision point and a source of conflict which leads to accidents, especially fatal accidents.
  Roundabouts, which are an alternative to a signalized intersection which can dramatically reduce fatal accidents but require a considerable amount of landmass.
  Highway off/on ramps, which are a source of conflict. Ramp metering can also be a decision point which can affect traffic flow.

On a long highway, for example, sensors 502 can be located in any place suitable to provide a FOV that will cover the highway.

In some embodiments, sensors 502 are mounted at a location where electricity can be provided and where visibility of the road network is enabled. In other embodiments sensors 502 and/or other components of the network of sensors, may be mobile and self-powered, e.g., by using solar panels or batteries.

FIG. 5 shows a typical 4-way intersection 500. In this embodiment a sensor 502 can be installed on each way of the intersection, e.g., on a traffic light mast and/or lighting pole 512 or any other suitable location that enables full sensor coverage of the center of the intersection and as much coverage (e.g. 200 meters) from the stop line 513 on each way.

Full sensor coverage means that the sensors 502 are able to obtain enough data and at a quality to enable detection and classification of road users, e.g., vehicle 515.

In this embodiment a control unit 506, which may be similar to control unit 406 described above, is in communication with the sensors network and with a traffic light controller 507. The control unit 506 may also be in communication with V2X communication modules 503, which may be located at the same locations of sensors 502 and/or at appropriate locations to receive and transmit information from and to connected users and/or to the control unit 506.

In some embodiments a sensor 502 and possibly a V2X communication module 503 can be part of a single unit and several such units in communication with each other and/or in communication with the control unit 506, can be located on poles 512 at the intersection 500 to provide broader coverage of the intersection.

Control unit 506 may provide real-time instructions to the traffic light controller 507 based on inputs from sensors 502 and V2X communication modules 503. This embodiment, which includes using input from one or more sensor 502 and V2X communication modules 503 enables relating to all road users at a site (e.g., in vicinity of intersection 500) even if they are not connected, providing more accurate and complete control of traffic in order to improve the traffic flow and reduce accidents at the site.

As discussed above, processing unit 104 can calculate an estimated time of arrival (ETA) of a specific road user at a location, e.g., using a virtual map, and may control a device according to the ETA.

In one embodiment, road network infrastructure can be controlled based on a calculated ETA. For example, authorized road users, such as emergency vehicles (e.g., police cars, fire trucks, ambulances) and public transportation (e.g., buses, trains and ride sharing) can be given priority in signalized intersections to minimize their delay and improve their safety and service level.

Figure 6:
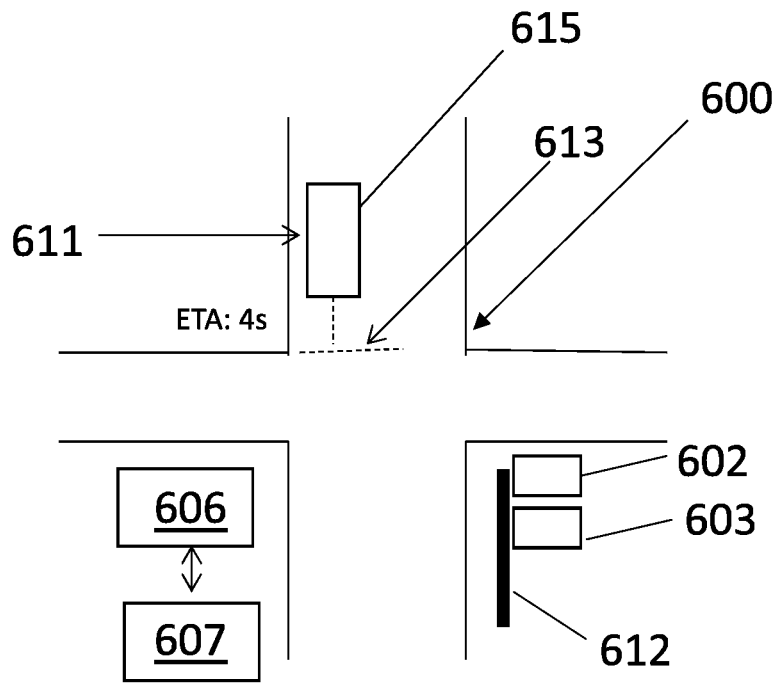
FIG. 6 schematically illustrates calculation of an ETA of a road user, according to an embodiment of the invention.

In one embodiment, which is schematically illustrated in FIG. 6, a road user 615 is detected in vicinity of intersection 600, for example, based on image analysis and/or based on V2X transmissions, as described above. Parameters such as bearing, speed and acceleration of road user 615 at a first location 611 can be used to calculate the time it would take the road user 615 to arrive at a second location 613. Typically, the calculations are done using a virtual map, as described above. An ETA of the road user 615 at the location 613 on the road network can be generated based on the calculated time.

In one embodiment an ETA historical model (such as RNN) that predicts the ETA of each road user at predetermined locations can be created by taking into account parameters such as speed, acceleration, bearing, classification and past and predicted trajectory.

On top of the historical model, a real-time interaction model (for example a CNN+RNN) based on past and predicted trajectories of all road users from the virtual map takes into account the other road users to further improve the accuracy of the ETA metric.

A control unit 607 can control a road network infrastructure 612, such as a traffic light, based on the generated ETA.

Figure 7A:
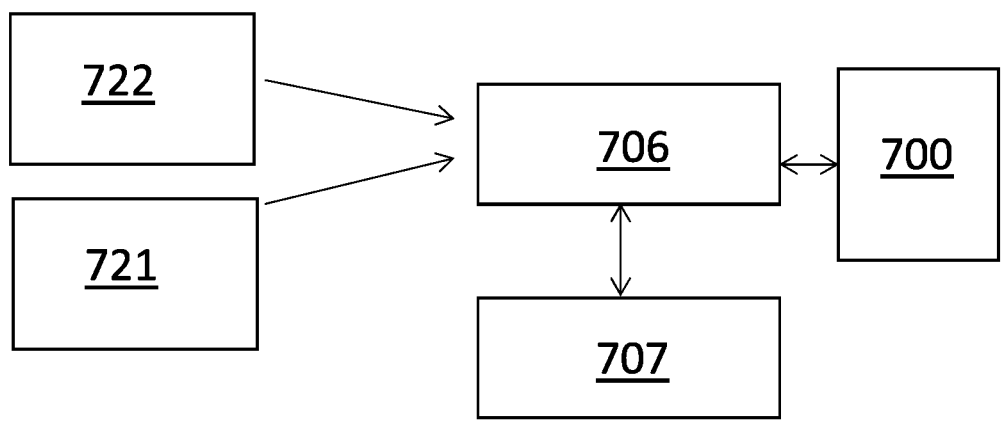
FIGS. 7A-7D schematically illustrate methods for traffic preemption, according to embodiments of the invention.

In one example, which is schematically illustrated in FIG. 7A, a control unit 706 controls a road network infrastructure controller (e.g., traffic light controller 707) based on prevailing road network rules. The road network rule may include, for example, preemption rules based on municipal or other policies.

In this example, the control unit 706 receives from virtual map 700 an indication of a road user, e.g., a road user 615, approaching a site, e.g., location 613 in intersection 600. In addition, the ETA of the road user (4 seconds) is provided from virtual map 700. Control unit 706 can identify and classify the road user, e.g., based on inputs from a sensor and/or V2X communication module.

In one embodiment, the road user is an authorized vehicle, namely, a vehicle type authorized to get preemption as defined by city policies. Authorized vehicles may include, for example, emergency vehicles (such as police cars, ambulances, fire trucks) and public transportation vehicles (such as buses and trains). In this case a fine-grained classifier (such as a CNN) can be trained on images of emergency vehicles, public transportation vehicles and other relevant vehicles for preemption. The classifier can be used to provide a reliable fine-grained classification of "authorized vehicles" from data obtained from a sensor, such as image data.

Using the information from virtual map 700 and fine-grained classification, the control unit 706 may build an ETA historical model (such as RNN) that predicts the ETA of each "authorized vehicle" to a predetermined location, e.g., to the stop line of an intersection, by taking into account the fine-grained classification of the road user (e.g. bus vs ambulance) and other parameters such as speed, acceleration, bearing and past and predicted trajectories.

The ETA can be added to the information included in virtual map 700 for each authorized vehicle.

On top of the historical model, a real-time interaction model (for example a CNN+RNN) based on past and predicted trajectories of all road users, takes into account the other road users (e.g. the vehicles in front of the authorized vehicle) to further improve the accuracy of the ETA metric in the virtual map 700.

The control unit 706 can access information from the city's policy 722, which determines preemption rules, e.g., which kind of road user has priority over others and when. For example, a bus might be prioritized over a light-rail in the afternoon. The control unit 706 uses information from virtual map 700 and from the city's policy 722 to decide which road user should get priority and therefore which phase of the traffic light controller needs to be served. In one embodiment, the control unit 706 creates a record (e.g., a list or table or other way of maintaining data) of authorized vehicles sorted by priority and ETA and computes for each authorized vehicle if it can be served without interrupting a higher priority vehicle. For example, consider a case of a light-rail approaching an intersection from the north with an ETA of 10 seconds and a bus approaching from the west with an ETA of 4 seconds. The bus needs 2 seconds to pass the intersection. A city policy of prioritizing light-rail over buses will give priority to the bus even though the light-rail has higher priority, due to the fact that both demands can be served without causing extra delay.

In a different case, where the ETAs for both the bus and the light-rail are similar, then priority will be given to the light-rail in order to minimize delay to the light-rail, as it has higher priority in the city's policy.

The control unit 706 then controls the traffic light controller 707 using a preemption signal (e.g. ABC NEMA TS-1, C1 Caltrans, SDLC, NTCIP, etc.) or through a regular call (e.g. using loop emulation, NTCIP call, etc.) in case the traffic light controller 707 is running in fully-actuated mode.

In some embodiments control unit 706 may have access to a record of authorized road users 721 and may compare the identity of the road user with the record of authorized road users 721, to determine if the road user is an authorized user.

Figure 7B:
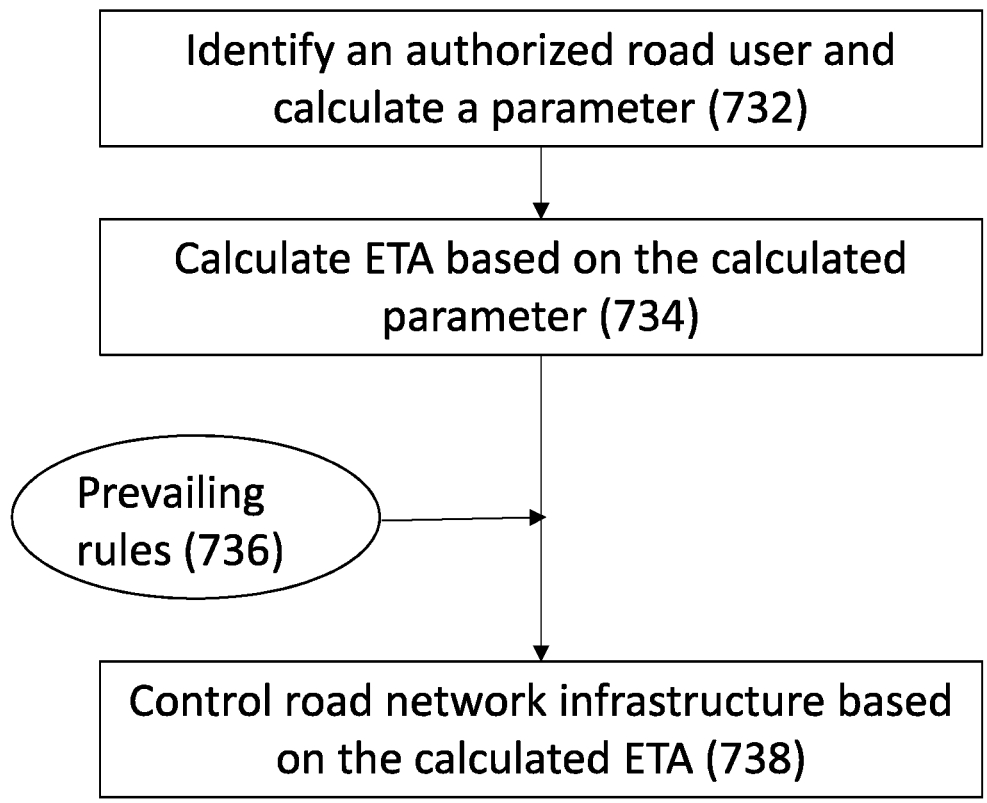

In one embodiment, which is schematically illustrated in FIG. 7B, an authorized user (or other class or identity of a road user) is identified and at least one parameter of the authorized user is calculated (step 732). In one embodiment the authorized user is identified based on input from a sensor (e.g., based on image data and/or radar and/or lidar data).

An ETA is calculated for the authorized user, based on the calculated parameter (step 734). For example, speed, bearing and acceleration of the identified authorized user can be used to calculate the ETA of the user.

Based on prevailing road network rules 736 and based on the calculated ETA, road infrastructure can be controlled (step 738), for example, to prioritize the authorized road user.

Figure 7C:
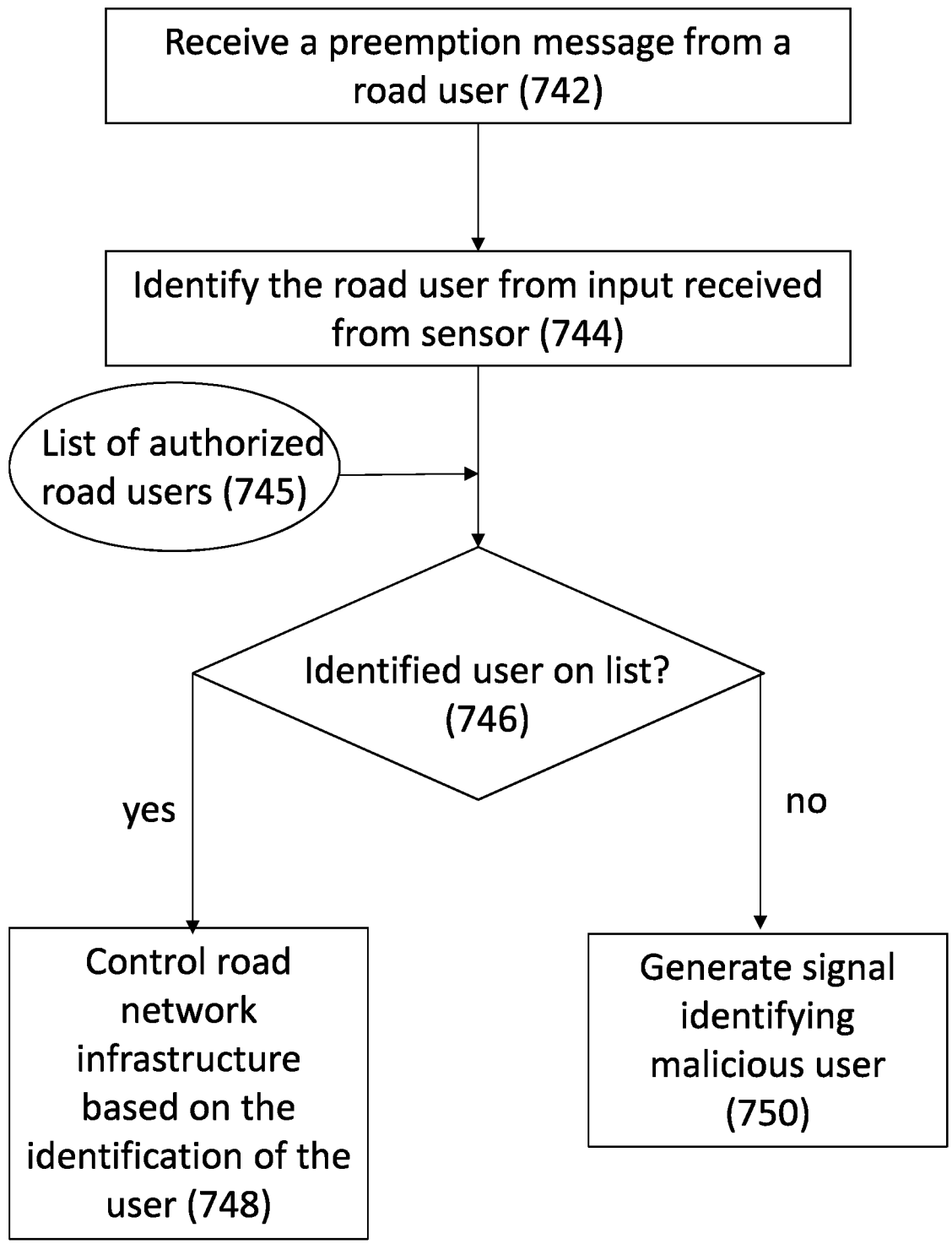

In one embodiment, which is schematically illustrated in FIG. 7C, a processing unit receives a preemption message (such as an SRM) from a road user (step 742). Typically, the preemption massage is sent from a connected road user.

The road user is identified (step 744), for example, based on input from a sensor, and the identified road user is compared to a record, e.g., list of authorized road users (745). If the road user is identified on the list (step 746), a road network infrastructure is controlled based on the identification of the user (step 748). If the road user is not identified on the list (step 744) a signal is generated identifying a malicious road user (step 750).

Figure 7D:
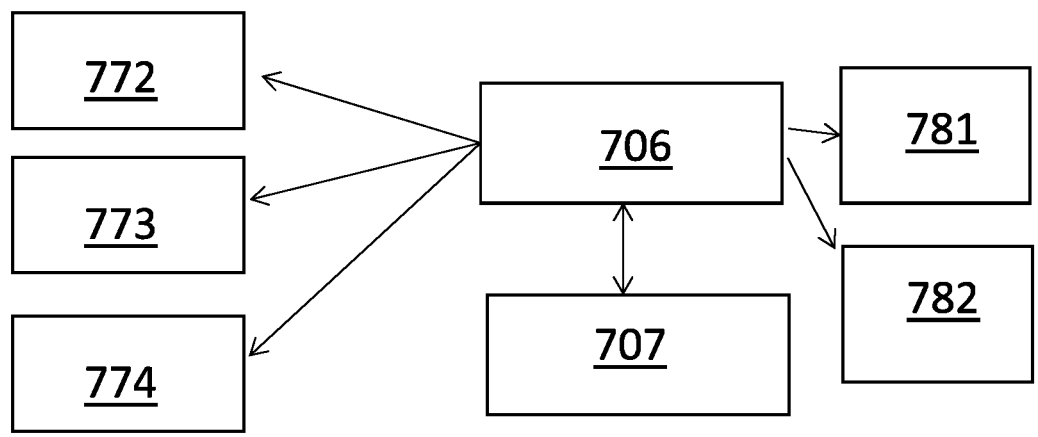

As schematically illustrated in FIG. 7D, a signal identifying a malicious road user may cause the road user to be added to a list of suspected malicious users.

In one embodiment, a control unit 706 receives input from a sensor (e.g., camera) and a V2X communication module. The control unit 706 is also in communication with a traffic light controller 707 and has access to several records; a "blacklist" 772 listing malicious/malfunctioning road users, a "greylist" 773 listing suspected malicious users, and a "whitelist" 774 listing confirmed authorized road users (typically a list maintained by the city and/or vehicle manufacturers).

In one embodiment, control unit 706 receives a preemption request from a connected road user. For example, the connected road user may send an SRM message with its calculated ETA to a location (e.g., location 613 at intersection 600) and indicate it wants priority in a specific part of the road network at a predetermined time. Control unit 706 may provide preemption for the connected user if the user is listed in the "whitelist" 774.

Once it is determined that the connected road user should be within the sensor FOV (e.g., based on the parameters transmitted by the connected user and/or based on its calculated ETA), the connected road user is matched to road users in locations within the sensor FOV, using a virtual map. If no match is found for a predetermined amount of time (e.g., 5 seconds), an identifier of the connected road user (e.g. his V2X digital certificate, license plate number, etc.) is added to the "greylist" 773. Information is then sent (e.g. using an email, SMS, NTCIP or any suitable API) by the control unit 706 to the city's traffic management center (TMC) 781 and to the Original Equipment Manufacturer—OEM 782 (e.g. the vehicle manufacturer or operator) regarding a possible malfunction or hacking attempt by the connected road user. The connected road user's identifier may then be moved (at the TMC 781 and/or OEM 782 discretion) to the "blacklist" 772 or to the "whitelist" 774.

In another embodiment, the connected road user may be identified or classified (e.g., by using a classifier on image data received from the sensor) as being in the same class (e.g. a bus) that was used in the preemption message. In this case the control unit 706 can cross-validate the information transmitted from the connected road user by V2X with the sensor information (e.g., by matching the connected road user to a user on a virtual map) and based on a positive match the control unit 706 can proceed safely with preemption.

If the connected road user is not classified in the same class that was used to request the preemption (e.g. the connected road user is classified as a private car vs a bus) then the connected road user is considered to be malicious and its identifier is added to the "greylist" 773 for further inspection by the TMC 781 and/or OEM 782, and the preemption is canceled by dropping the call/preemption signal to the traffic light controller 707.

In one embodiment, V2X information can be used in order to estimate a number of road users that are outside the sensor FOV in order to predict a future number of users within the FOV, and provide a better decision regarding the traffic signal timing. For example, if it is estimated that 10 vehicles are arriving at a signalized intersection, the green light time may be extended even though there no vehicles currently detected by the sensor.

Figure 8:
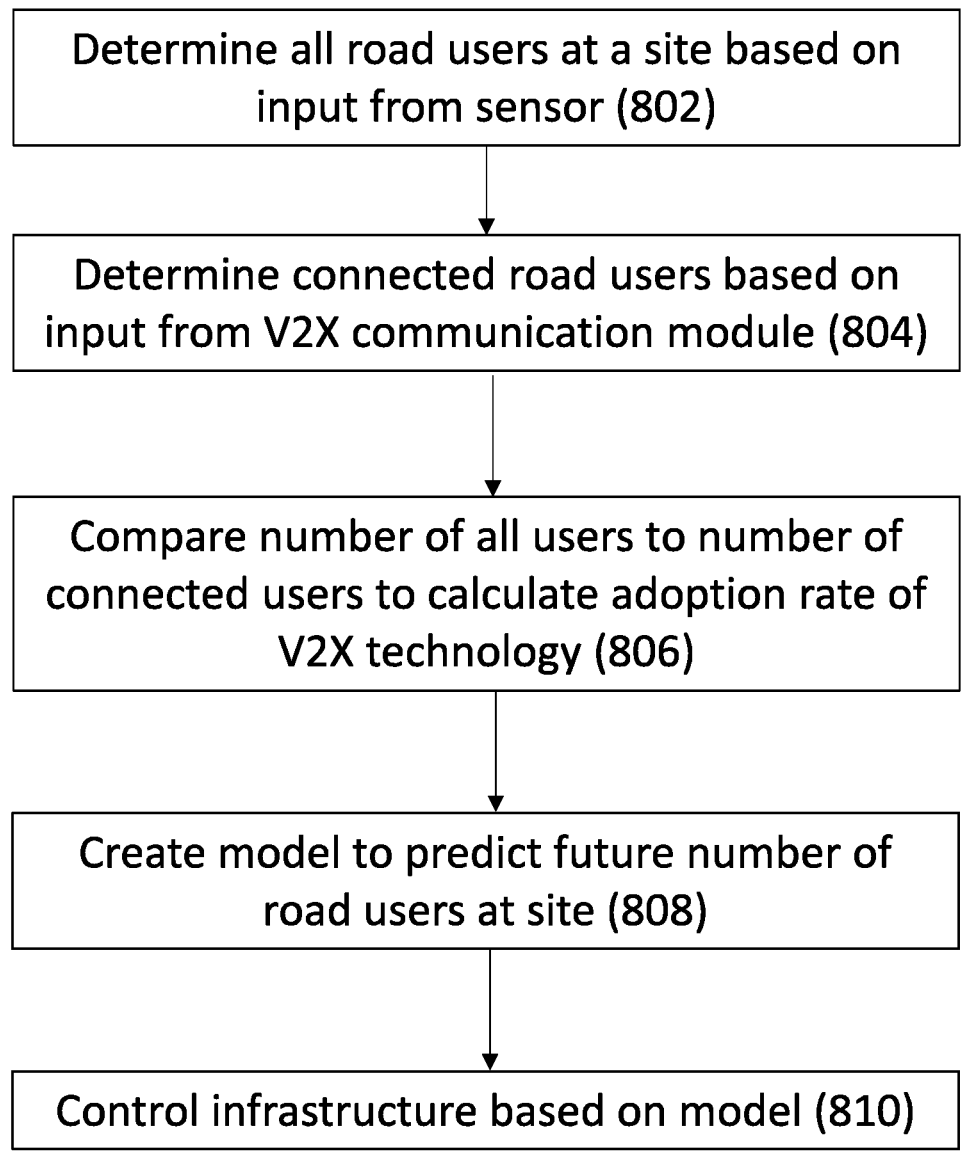
FIG. 8 schematically illustrates a method for predicting future use of a road network site, according to an embodiment of the invention.

In one embodiment, which is schematically illustrated in FIG. 8, a method is provided for estimating a number of road users at a location on a road network. In this embodiment a processing unit estimates a number of road users arriving at a predetermined location at a certain time, based on inputs from a sensor and a V2X communication module.

In step 802 a total number of road users at a certain time at a certain site, is calculated, for example, based on input from a sensor mounted on the road network in vicinity of the site.

In step 804 a number of connected road users at the certain time in vicinity of the site, is calculated, based on input from a V2X communication module.

For example, every connected road user reports its ID, location, speed, bearing, past and predicted trajectory, e.g., using BSM/CAM/PSM messages, via V2X communication, to a processing unit. When a connected road user enters an area of a FOV of a sensor, a match is searched between the connected road user and the road user detected by the sensor. The amount of connected road users and all road users is calculated, as described above.

An adoption rate of V2X technology (defined as percentage of connected road users out of all road users) can be calculated in step 806 by comparing the total number of road users and the number of connected road users. For example, using the locations of connected road users and total road users, as detected by the sensor, and identifying which of the total road users is a connected road user, an exact measure of the V2X adoption rate can be obtained.

In step 808 a model to predict a future number of road users at the site, is created using the adoption rate. The model may be built by running an SVM or RNN using the adaption rate calculated in step 806, over time. The model may predict the total amount of road users outside the sensor's FOV, based on time of day, observed amount of connected road users, observed amount of all road users, their class (e.g. bus, truck, etc.) and past trajectory of connected road users outside of the sensor FOV.

The prediction model may be refined over time by measuring the prediction error based on the difference between the predicted amount of road users and the actual number of road users as detected by the sensor.

In step 810 a road network infrastructure may be controlled based on the model.

Thus, according to embodiments of the invention, a processing unit is configured to estimate the number of road users based on an adoption rate (rate of use) of V2X technology.

In some embodiments, behavior parameters of a specific road user can be detected based on a virtual map. For example, a dangerous behavior of a road user and/or a dangerous event can be detected, based on the virtual map.

Figure 9A:
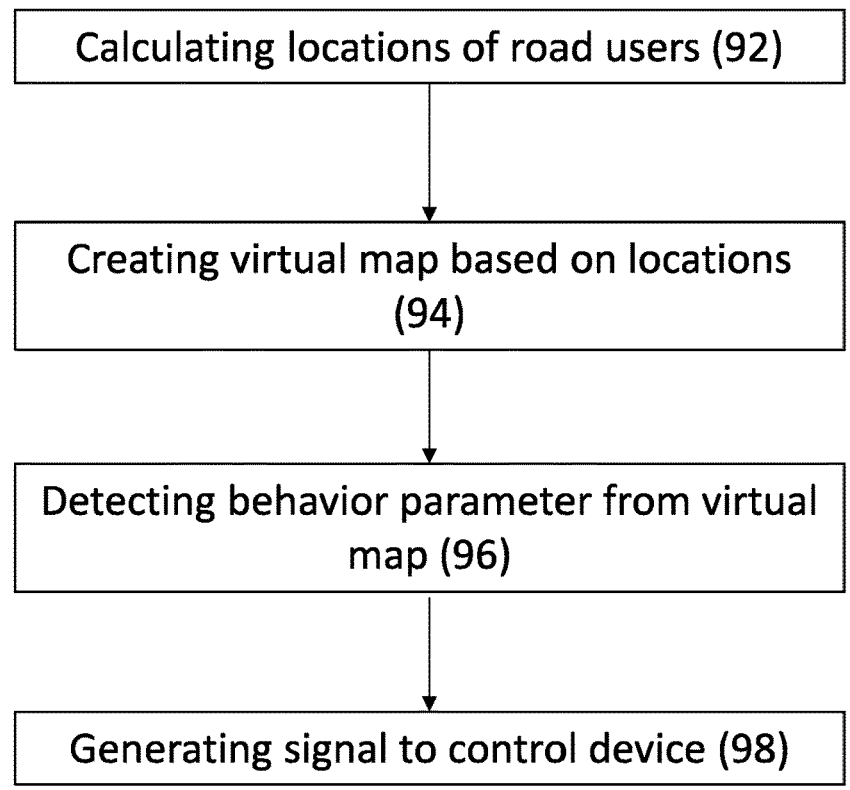
FIGS. 9A-9D schematically illustrate methods for estimating dangerous situations on a road network, according to embodiments of the invention.

In one embodiment, an example of which is schematically illustrated in FIG. 9A, a method for traffic control includes calculating (e.g., by processing unit 104) locations of road users based on sensor data and V2X communication (step 92) and creating a virtual map which includes the locations of the road users (step 94). A behavior parameter of any specific road user can then be detected from the virtual map (step 96). Behavior parameters may include characterizations of the road user's behavior. For example, behavior parameters may include driving directions, acceleration patterns, etc., whereas erratic driving direction, erratic acceleration patters, etc., may indicate dangerous behavior, as further exemplified below.

In step 98 a signal is generated (e.g., by processing unit 104) to control a device based on the detected behavior parameter. For example, the signal may include a V2X communication to other road users to warn them of dangerous behavior of a specific road user. Alternatively, or in addition, the signal may be used to control a road network infrastructure. For example, a traffic light may be controlled to change phases based on detected behavior parameters. Road network infrastructure (e.g., dynamic signs) may be controlled to produce a warning based on the detected behavior parameters.

In some embodiments, an ETA to a real-world location (e.g., a stop line at an intersection) is calculated for the specific road user and for the other road users, based on the virtual map, and a signal is generated based on the ETA.

In some embodiments a probability of a dangerous event (e.g. collision) can be calculated based on the virtual map and based on detected behavior parameters. The signal to control devices (such as a road network infrastructure and/or a V2X communication module to warn other road users) may be generated taking into account the calculated probability.

In some embodiments, input regarding ambient conditions (e.g. weather, lighting) at the real-world locations of the road users and/or at the locations at which they are estimated to arrive, can be received at the processing unit and the probability of a dangerous event can be calculated based on the ambient conditions.

Possibly elements, such as classification of road users (e.g., a heavy-duty truck vs a private vehicle), the weather conditions, time of day, etc., may be weighted and used to determine the probability of a dangerous event.

A more detailed explanation is provided in the description below, exemplifying dangerous behaviors.

Figure 9B:
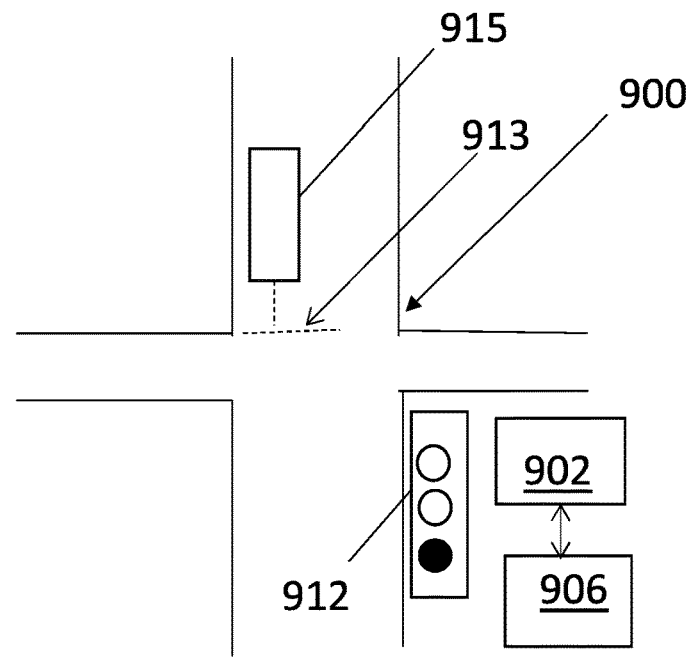

In one embodiment, which is schematically illustrated in FIG. 9B, there is provided a method for detecting and alerting against red-light-runners.

A control unit 906 is in charge of deciding which phase (e.g., color of light, direction indicated by light, etc.) of traffic light 912 is served and for how long. In the example illustrated in FIG. 9B, the status of the phase is green. The control unit 906 maintains the status of all phases, for example, by maintaining a counter to determine how many seconds are left until the phase becomes red.

A virtual map of all road users (including connected road users) is calculated periodically, e.g., at least every 0.1 second (i.e. at 10 hz).

In some embodiments, an image-based weather classifier (such as a CNN) is fed with an image from the sensor 902 and performs a classification on the weather condition (e.g. light rain, fog, flare from the sun, etc.) of the specific real-world location where the sensor 902 is installed (e.g., intersection 900).

For the phase that is currently on (green) and for every road user (e.g., vehicle 915) approaching the traffic light 912 during the green phase, a probability of crossing the intersection at a red light is calculated based on remaining phase time, location, speed and acceleration of the road user and weather conditions. The probability may be a weighted combination of several elements such as parameters and/or classification of a road user, weather conditions, distance to stop line 913 and others.

In some embodiments, machine learning algorithms are used to identify dangerous behavior of a road user. For example, a braking prediction model (such as an RNN) may be created based on the time of day, class of road user (pedestrian, private vehicle, truck, etc.), weather conditions (rain, visibility, etc.), speed, acceleration, bearing, past trajectory, distance to stop line 913 and phase status (e.g., green, yellow). A machine learning model may be trained on data from the specific real-world location (e.g., intersection 900) and on a general dataset (e.g., on a database including data from a plurality of intersections).

In another example, a physical model is created (e.g. using classic mechanics). The physical model estimates the braking time (and distance) based on the class of the road user (e.g. a heavy-duty truck vs a private vehicle) which determines the typical deceleration, speed, acceleration, bearing and distance to stop line.

A probability of a road user crossing the intersection 900 during a red light is based on the relation between breaking time (e.g., as calculated using the models described above) and remaining green time of the phase, calculated using a log function. When the probability of crossing a red light rises above a predefined threshold (e.g. 80% probability of running the red light) a red-light-running (RLR) alert message (e.g. Intersection Collision Avoidance message in SAE J2735) is sent by the control unit 906 to the connected road users in vicinity of the control unit 906. The message is typically sent together with the latest status (i.e. the location, acceleration, bearing, speed, etc.) of the road user and the probability of running the red light.

Figure 9C:
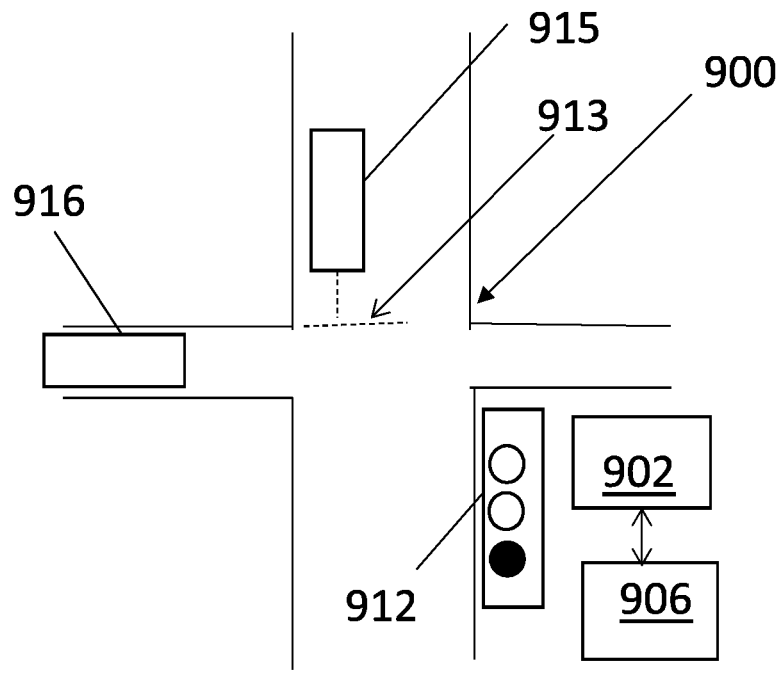

In FIG. 9C a method for alerting a possible collision, is schematically described.

A virtual map of all road users (including connected road users), e.g., vehicles 915 and 916, is calculated periodically, e.g., at least every 0.1 second (i.e. at 10 hz).

Weather conditions at the location of intersection 900 are determined, e.g., as described above.

For each road user, e.g., vehicle 915, a time to collision (TTC) with every other road user, e.g., vehicle 916 in his vicinity, is calculated based on the data from the virtual map (location, speed, acceleration of every road user) and the weather conditions. The TTC may be weighted. The weighted TTC may be a combination of parameters, such as:

TTC at brake—a standard metric in the traffic engineering world which is calculated based on the distance (calculated using the distance function described above) between two road users, their speed, bearing and an estimation of the breaking time (which may be calculated as described above)

Breaking probability, calculated as described above.

When the TTC of a road user rises above a predefined threshold (e.g. 1 second) a collision warning message (e.g. Intersection Collision Avoidance message in SAE J2735) is sent by the control unit 906 to the connected road users (e.g., vehicle 916) in vicinity of the control unit 906. The message is typically sent together with the latest status (i.e. the location, acceleration, bearing, speed, etc.) of the road user, e.g., vehicle 915.

Figure 9D:
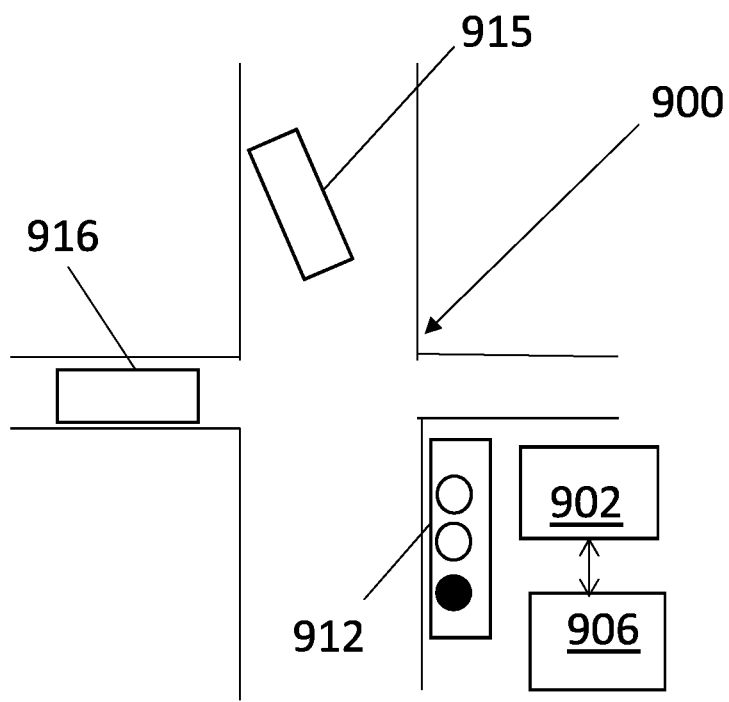

In FIG. 9D a method for alerting road users regarding a dangerous road user is schematically described.

A virtual map of all road users (including connected users) is calculated periodically, e.g., at least every 0.1 second (i.e. at 10 hz).

Weather conditions at the location of intersection 900 are determined, e.g., as described above.

A classifier (such as an RNN) for dangerous behavior is trained on a dataset of many road users exhibiting dangerous behavior (e.g. erratic driving directions and/or accelerating patterns, such as, driving out of control, driving in zig zag, not staying in the lanes, pedestrians jumping into the street etc.) and taking into consideration: past trajectory, speed, acceleration, bearing and the class of the road user and location of the other road users. The weather condition classification is also taken into consideration.

The result of the classifier is whether any of the road users are acting normally or exhibiting dangerous behavior and the behavior classification (e.g. out of control) and the confidence in that classification.

When the classifier, using real-time data, classifies that a road user, e.g., vehicle 915, is exhibiting a dangerous behavior and the confidence (probability) is above a predefined threshold (e.g. 80%) a warning message is sent by the control unit 906 together with the latest status of the road user, classified behavior (e.g. out of control) and confidence, to the connected road users, e.g., vehicle 916, in the vicinity of the control unit 906.

Embodiments of the invention enable using information including locations of connected and non-connected road users in a myriad of solutions to existing and future challenges and opportunities.

Embodiments of the invention bring substantial benefits in terms of safety and comfort, and may also contribute to improved and more granular traffic management, provide a better way to prevent or reduce congestion, and enable fuel savings and reduction of air pollution.

The invention claimed is:

1. A method for identifying connected and non-connected road users at a site on a road network, for traffic control, the method comprising:
receiving at a processing unit sensor data informative of road users at the site and processing the sensor data to detect road users, wherein the sensor data is received from one or more sensors located externally to the road users;
receiving at the processing unit V2X communications comprising data informative of connected road users;
using the sensor data to obtain user parameters of all detected road users to yield a sensor data-based plurality of all detected road users characterized by respective sensor-based user parameters, wherein said sensor-based user parameters include location and at least one of speed, acceleration, bearing, classification, past trajectory and predicted trajectory, and wherein the sensor data-based plurality of all detected users comprises connected road users and non-connected road users;
using the data comprised in the received V2X communications to obtain V2X-based parameters of connected road users to yield a V2X communications-based plurality of connected road users characterized by respective V2X-based parameters, wherein said V2X-based parameters include location and at least one of speed, acceleration, bearing, classification, past trajectory and predicted trajectory;
matching between data in the sensor data-based plurality of all detected road users and in the V2X communications-based plurality of connected road users to identify unmatched road users as non-connected and matched road users as connected, wherein the matching comprises defining similarities between respective sensor-based location and V2X-based location and between at least one corresponding other pair of sensor-based and V2X-based parameters, and wherein a match is found when the defined similarities exceed respective thresholds and is not found when the defined similarities are less than respective thresholds;
creating a virtual map comprising the locations of the connected and non-connected road users; and
generating a signal to control a device based on the virtual map.

2. The method of claim 1,
wherein the virtual map comprises the parameters of specific connected and non-connected road users.

3. The method of claim 1, comprising:
calculating an estimated time of arrival (ETA) of a specific road user at a real-world location, based on the virtual map; and
generating a signal to control the device based on the ETA.

4. The method of claim 1, comprising:
detecting behavior parameters of a specific road user based on the virtual map; and
generating a signal to control the device based on the behavior parameters.

5. The method of claim 1 wherein the sensor data comprises one or more of optical image data, radar data and point cloud data.

6. The method of claim 1 comprising classifying a specific road user based the sensor data.

7. The method of claim 1 comprising:
selecting one of the parameters of a non-connected road user; creating a message set based on the selected parameter; and
sending the message set to connected road users, via a V2X communication module.

8. The method of claim 1 wherein the device comprises a road network infrastructure.

9. The method of claim 8 comprising:
identifying a road user, based on the sensor data;
calculating an ETA of the identified road user to a predetermined location on the road network; and
generating a signal to control the road network infrastructure based on the calculated ETA.

10. The method of claim 9 comprising generating the signal to control the road network infrastructure based on prevailing road network rules.

11. The method of claim 10 wherein the identified road user is an authorized user.

12. The method of claim 1 comprising:
receiving a preemption message from a road user;
identifying the road user based on the sensor data;
comparing between a record of authorized road users and the identified road user; and
generating a signal identifying a malicious road user based on the comparison.

13. The method of claim 12 wherein the signal identifying a malicious road user causes the road user to be added to a record of suspected malicious users.

14. The method of claim 1 comprising:
receiving a preemption message from a road user;
classifying the road user based on the sensor data;
comparing between a record of authorized road users and the classified road user; and generating a signal to control a road network infrastructure based on the comparison and based on prevailing road network rules.

15. The method of claim 1 comprising calculating an adoption rate of V2X technology from the sensor data and the V2X communication.

16. The method of claim 15 comprising:
calculating a total number of road users arriving at a certain time at the site, based on input from a sensor mounted at the road network in vicinity of the site;
calculating a number of connected road users arriving at the certain time at the site, based on input from a V2X communication module;
calculating an adoption rate of V2X technology by comparing the total number of road users and the number of connected road users; and
creating a model, using the adoption rate, to predict a future number of road users at the site on the road network.

17. The method of claim 1 comprising:
calculating an estimated number of road users arriving at a predetermined real-world location at a certain time, based on the sensor data and the V2X communication; and
generating a signal to control a road network infrastructure based on the estimated number.

18. A non-transitory computer readable medium comprising instructions that, when executed by a processing unit, cause the processing unit to perform a method of identifying non-connected road users at a site on a road network, for traffic control, the method comprising:
receiving at a processing unit sensor data informative of road users at the site and processing the sensor data to detect road users, wherein the sensor data is received from one or more sensor located externally to the road user;
receiving at the processing unit V2X communications comprising data informative of connected road users;
using the sensor data to obtain user parameters of all detected road users to yield a sensor data-based plurality of road users characterized by respective sensor-based user parameters, wherein said sensor-based user parameters include location and at least one of speed, acceleration, bearing, classification, past trajectory and predicted trajectory and wherein the sensor data-based plurality of all detected users comprises connected road users and non-connected road users;
using the data comprised in the received V2X communications to obtain V2X-based parameters of connected road users to yield a V2X communications-based plurality of connected road users characterized by respective V2X-based parameters, wherein said V2X-based parameters include location and at least one of speed, acceleration, bearing, classification, past trajectory and predicted trajectory;
matching between data in the sensor data-based plurality of all detected road users and in the V2X communications-based plurality of connected road users to identify unmatched road users as non-connected and matched road users as connected, wherein the matching comprises defining similarities between respective sensor-based location and V2X-based location and between at least one corresponding other pair of sensor-based and V2X-based parameters, and wherein a match is found when the defined similarities exceed respective thresholds and is not found when the defined similarities are less than respective thresholds.

* * * * *

UNITED STATES PATENT AND TRADEMARK OFFICE
CERTIFICATE OF CORRECTION

PATENT NO. : 11,967,230 B2
APPLICATION NO. : 17/052208
DATED : April 23, 2024
INVENTOR(S) : Uriel Katz, Or Sela and Tal Kreisler It is certified that error appears in the above-identified patent and that said Letters Patent is hereby corrected as shown below:

In the Claims

Claim 18, Column 20, Line 34 should read as follows: -- less than respective thresholds; creating a virtual map comprising the locations of the connected and non-connected road users; and generating a signal to control a device based on the virtual map. --

Signed and Sealed this
Twenty-eighth Day of January, 2025

Coke Morgan Stewart
*Acting Director of the United States Patent and Trademark Office*